United States Patent [19]

Evans

[11] Patent Number: 4,548,425

[45] Date of Patent: Oct. 22, 1985

[54] SHEATH FOR STORING AND PRESENTING SHOULDER BELT

[75] Inventor: Keith M. Evans, Troy, Mich.

[73] Assignee: General Motors Corporation, Detroit, Mich.

[21] Appl. No.: 563,130

[22] Filed: Dec. 19, 1983

[51] Int. Cl.[4] .............................................. B60R 21/10
[52] U.S. Cl. ..................................... 280/808; 297/481
[58] Field of Search .............. 280/801, 802, 804, 807, 280/808; 297/481, 482, 483, 486

[56] References Cited

U.S. PATENT DOCUMENTS

| 3,811,703 | 5/1974 | Turkovich | 297/482 |
| 4,033,594 | 7/1977 | Lindblad | 297/483 |

FOREIGN PATENT DOCUMENTS

| 2360702 | 6/1975 | Fed. Rep. of Germany | 280/808 |
| 2822055 | 11/1979 | Fed. Rep. of Germany | 280/802 |

Primary Examiner—Joseph F. Peters, Jr.
Assistant Examiner—Ross Weaver
Attorney, Agent, or Firm—Charles E. Leahy

[57] ABSTRACT

A motor vehicle occupant restraint belt system has a slide loop pivotally mounted on the pillar and dividing the belt into a retractable portion extending vertically along the pillar to a retractor and a restraint portion movable between an occupant restraining position extending across the occupant and a stored position extending along the pillar. A molded plastic sheath is pivotally mounted in conjunction with the slide loop and has a tubular sleeve which encloses a segment of the restraint portion of the belt. A retainer clip is provided on the pillar below the slide loop and retains the sheath in a stored position retaining the restraint portion of the belt stored against the pillar. The tubular sleeve has a reverse flange extending along the length thereof and adapted to capture the retractable portion of the belt when the sheath is stored against the pillar to prevent flapping in the airflow admitted through the door window. A friction detent is provided between the sheath and the pillar at the pivotal mount therebetween and functions to maintain the sheath at its pivotal orientation obtained during previous use of the belt in the restraining positions so that the sheath remains poised at that angular orientation and upon subsequent occupant reentry presents the belt to the occupant at this angular orientation.

4 Claims, 6 Drawing Figures

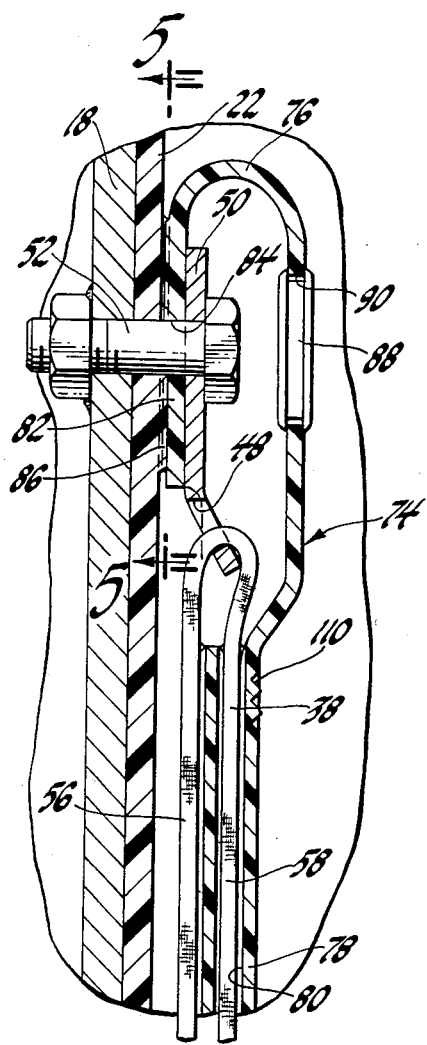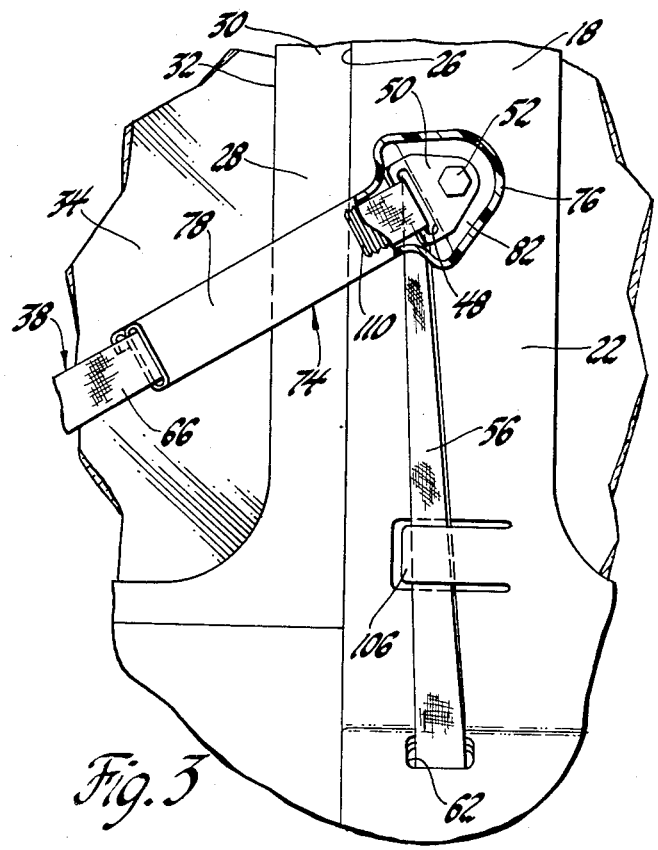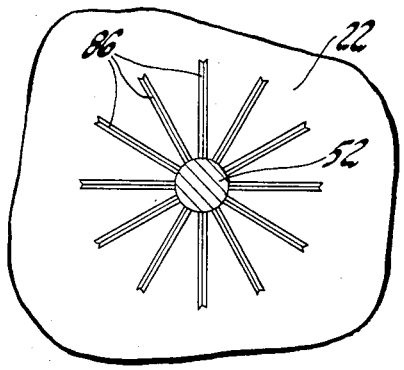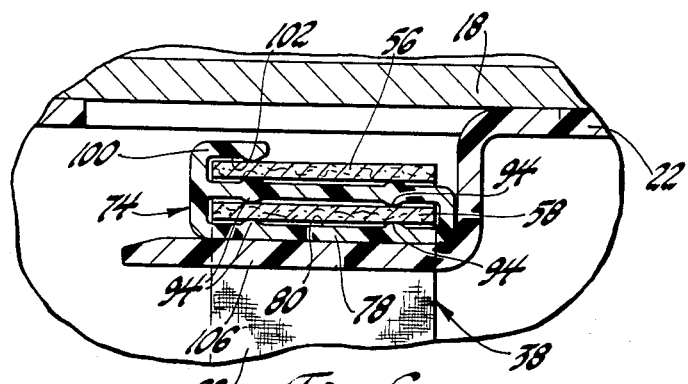
Fig. 3
Fig. 4
Fig. 5
Fig. 6

SHEATH FOR STORING AND PRESENTING SHOULDER BELT

The invention relates to a sheath pivoted on a pillar in conjunction with a shoulder belt slide loop and functioning to alternately store the belt against the pillar and present the belt at a preferred angular orientation for subsequent use by the seat occupant.

BACKGROUND OF THE INVENTION

It is well known for vehicle seat belt systems to employ a continuous-loop belt passing through a slide loop mounted high on the pillar of the vehicle body to divide the belt into a retractable portion which extends downwardly along the pillar to a retractor and a restraint portion having its end mounted on the floor by an anchor plate and carrying a slidable latch plate which divides the restraint portion into a shoulder belt segment and a lap belt segment.

It would be desirable in such an occupant restraint system to provide a device for storing the restraint portion of the belt neatly along the pillar when the belt system is not in use. Furthermore, it would be desirable to suitably conceal the belt from airflow entering through the adjacent vehicle window so that the belt does not flap in the wind and make an annoying noise. Furthermore, it would be desirable to provide a device which would function to present the shoulder belt segment at a previously obtained angular orientation in readiness for subsequent use by the seat occupant upon entry into the vehicle.

SUMMARY OF THE INVENTION

A motor vehicle occupant restraint belt system has a slide loop pivotally mounted on the pillar for slidably mounting the belt and defining a retractable portion of the belt extending vertically along the pillar to a retractor mounted below the slide loop and a restraint portion movable between an occupant restraining position extending diagonally across the occupant and a stored position extending along the pillar in parallel relationship with the retractable portion. A molded plastic sheath is pivotally mounted in conjunction with the slide loop and has a tubular sleeve portion which extends along and encloses a segment of the restraint portion of the belt. The sheath is pivotally movable with the restraint portion of the belt between the restraining position and the stored position. A retainer clip is provided on the pillar below the slide loop and is adapted to snap retain the sleeve portion of the sheath in a stored position retaining the restraint portion of the belt in the stored position against the pillar. The tubular sheath has a reverse flange extending along the length thereof and adapted to capture the retractable portion of the belt when the sheath is stored against the pillar so that the retractable portion of the belt is protected against flapping in the airflow admitted through the door window. A friction detent is provided between the sheath and the pillar at the pivotal mount therebetween and functions to maintain the sheath at its pivotal orientation obtained during use of the belt in the restraining positions so that the sheath remains poised at that angular orientation and upon subsequent occupant reentry presents the belt to the occupant at this angular orientation.

One object, feature and advantage of the invention resides in the provision of a sheath pivotally mounted on the pillar in conjunction with the belt slide loop and adapted for retention to the pillar by a retainer clip so that the restraining portion of the belt is held in a stored position against the pillar.

Another feature, object and advantage of the invention resides in the provision of a frictional detent provided between a vehicle body pillar and a sheath pivotally mounted in conjunction with the pillar mounted slide loop so that the sheath will consistently present the belt to the occupant at the previously obtained pivotal orientation.

A still further feature, object and advantage of the invention resides in the provision of a sheath pivotally mounted in conjunction with a pillar mounted belt slide loop and having a tubular sleeve which extends along the restraining portion of the belt and has a reversely bent flange continuous along the length thereof and adapted to capture the retractable belt portion extending along the pillar so that the retractable belt portion is held against flapping in the airflow admitted through the door window.

BRIEF DESCRIPTION OF THE DRAWINGS

These and other objects, features and advantages of the invention will become apparent upon consideration of the description of the preferred embodiment and the appended drawings in which:

FIG. 3 is a view similar to FIG. 2 but showing the restraint portion of the belt in the occupant restraining positions;

FIG. 4 is a sectional view taken in the direction of arrows 4—4 of FIG. 2;

FIG. 5 is a sectional view taken in the direction of arrows 5—5 of FIG. 4 and showing a detent between the sheath and the vehicle pillar; and FIG. 6 is a sectional view through the storage sheath and the retainer clip taken in the direction of arrows 6—6 of FIG. 2.

DESCRIPTION OF THE PREFERRED EMBODIMENT

Figure 1:
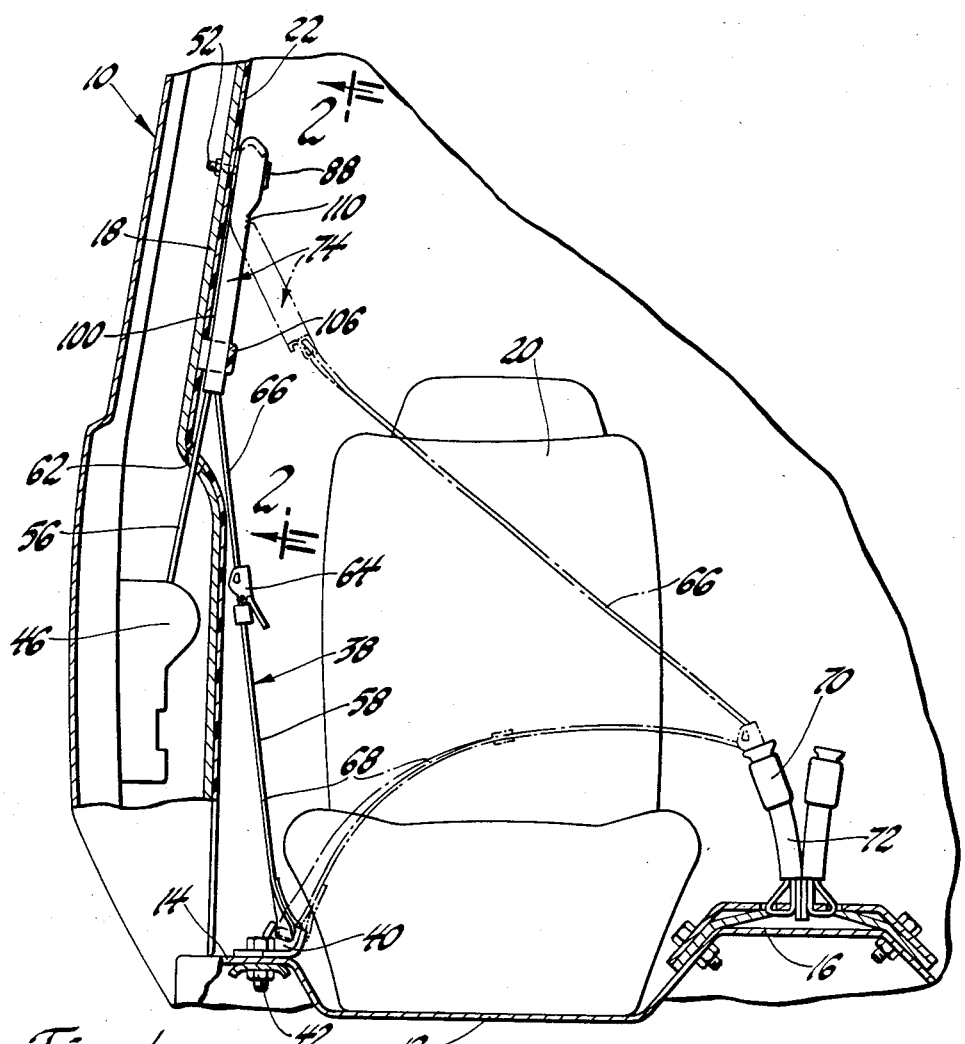
FIG. 1 is a longitudinal sectional view taken through a vehicle body having an occupant restraint system including the sheath for presenting and storing the belt according to this invention.
Figure 2:
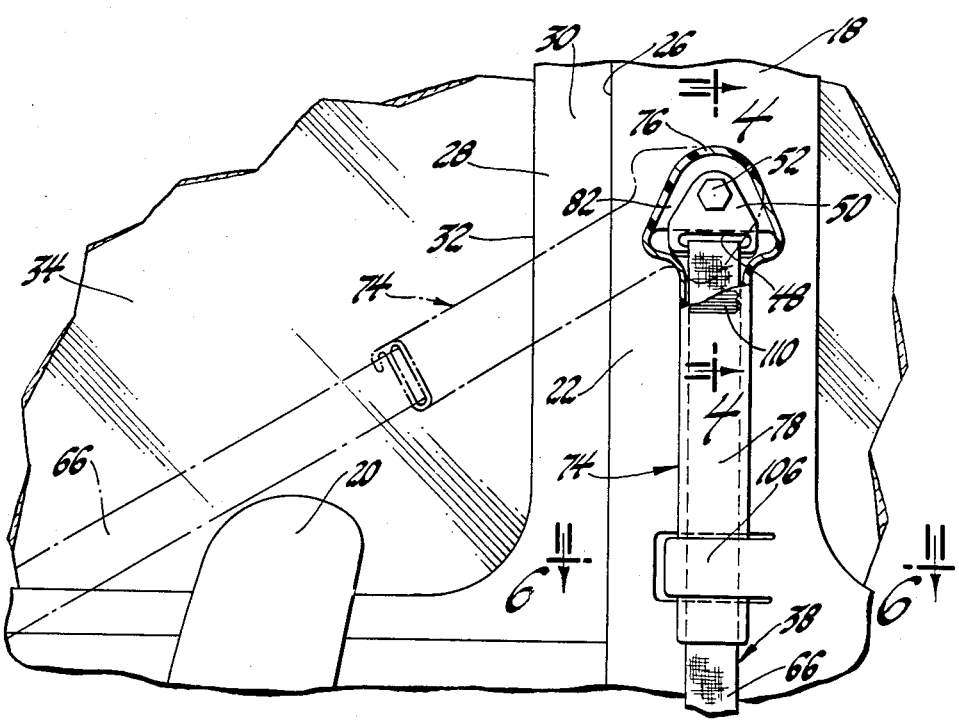
FIG. 2 is a view taken in the direction of arrows 2—2 of FIG. 1 and showing the restraint portion of the belt in the stored position.

Referring to FIG. 1, the vehicle body indicated by numeral 10 includes a floor 12 having an outboard sill 14 and an inboard transmission tunnel 16. A pillar 18 extends vertically adjacent the rear of the seat 20 outboard thereof and includes a trim panel 22 facing the occupant compartment of the vehicle body. As seen in FIG. 2 the pillar 18 defines a door opening 26 which is opened and closed by a door 28 having a pillar 30 defining a window opening 32 closed by a window 34.

An occupant restraint system for restraining an occupant in the seat 20 includes a continuous-loop belt 38 having one end attached to the sill 14 by an anchor plate 40 and bolt assembly 42. The other end of the continuous-loop belt 38 is connected to a retractor 46.

As best seen by reference to FIGS. 2 and 4, the continuous-loop belt 38 passes slidably through a slot 48 in a slide loop 50 which is pivotally mounted on the pillar 18 by a pivot bolt 52. The slide loop 50 functions to slidably divide the continuous-loop belt 38 into a retractable portion 56 and an occupant restraint portion 58. The retractable portion 56 extends generally vertically along the pillar 18 and passes through an opening 62 in the pillar 18 and trim panel 22 for passage into the retractor 46 which is mounted on the pillar 18 or other suitable body structure below the slide loop 50.

As best seen in FIG. 1, the restraint portion 58 slidably carries a latch plate 64 which divides the restraint portion 58 into a shoulder belt segment 66 and a lap belt segment 68. A buckle 70 is mounted on the transmission tunnel 16 by an anchor strip 72. When the latch plate 64 is latched by the buckle 70, the shoulder belt segment 66 of the restraint portion 58 is deployed diagonally across the upper torso of the occupant while the lap belt segment 68 of the restraint portion 58 is deployed across the occupant lap. The movement of the continuous-loop belt 38 between the solid line indicated stored position of FIG. 1 and the phantom line indicated restraining position of FIG. 1 is enabled by the winding and unwinding of the retractable portion 56 of the belt from the retractor 46 and the sliding movement of the continuous-loop belt 38 through the slide loop 50.

The present invention provides a sheath assembly, generally indicated at 74, which functions to alternately store the restraint portion 58 as shown in FIGS. 1, 2 and 6, and present the restraint portion 58 to the user as shown in FIG. 3. As best seen in FIGS. 4 and 6, the sheath assembly 74 is molded of plastic and includes a housing portion 76 which encloses the slide loop 50 and a tubular sleeve portion 78 which encloses a substantial length of the restraint portion 58 of the continuous-loop belt 38. As best seen in FIG. 4, the housing portion 76 includes a rear wall 82 having an aperture 84 which receives the bolt 52 to mount the sheath assembly 74 for pivotal movement relative the pillar 18. As seen in FIG. 5, the face of the pillar 18 has a plurality of integrally molded ribs 86 which radiate from the bolt 52 and interfit with mating ribs or recesses provided in the rear wall 82 of the sheath assembly 74. These ribs 86 and the interfitting ribs or notches in the sheath assembly define a friction detent by which the sheath is retained at whatever pivotal orientation is obtained relative to the pillar 18. The housing portion 76 has an access opening 90 which enables installation of the bolt 52. Plug 88 snaps into the access aperture 90.

Referring to FIG. 6, it is seen that the tubular sleeve portion 78 defines a rectangular passage 80 through which the restraint portion 58 of the belt passes during extension or retraction of the retractable belt portion 56 from the retractor 46. The tubular sleeve portion 78 has two pairs of opposed facing ribs, designated 94, which stiffen the tubular sleeve 78 against warping or collapse by the softening effect of sunlight shining through the window 34. The ribs 94 also function to provide a limited area of frictional contact between the restraint portion 58 of the belt and the tubular sleeve 78 so that the restraint portion 58 slides through the tubular sleeve with relatively low friction. The tubular sleeve 78 has an integral reverse bent flange 100 continuous along the leading edge thereof and defining a recess 102 which is adapted to fit over the edge of the retractable portion 56 of the belt when the sheath assembly 74 is pivoted to the stored position shown in FIGS. 2 and 6. Capture of the retractable portion 56 of the belt 38 in this manner conceals the edge of the belt from airflow entering the open window 34 and thereby prevents the retractable portion 56 of the belt from flapping in the wind and making an annoying noise.

As best seen in FIGS. 3 and 4, a plurality of notches 110 are provided at the junction between the housing portion 76 and tubular sleeve portion 78 of the sheath assembly to enable the tubular sleeve portion 78 to pivot somewhat inwardly away from the pillar as shown in FIG. 1.

As best seen in FIGS. 1, 2 and 6, a retainer clip 106 is carried by the pillar 18 below the slide loop 50 and functions to receive the tubular sleeve 78 and retain the tubular sleeve at the pivotal orientation of FIG. 2 and against the pillar 18 as best shown in FIG. 1. The retainer clip 106 is conveniently provided as an integral tab molded with the trim panel 22 but may be a separate plastic or metallic clip suitably mounted thereon.

OPERATION

FIG. 1 shows the restraint belt system in the stored position. The retractor 46 winds the retractable portion 56 so that the restraint portion 58 extends vertically along the pillar from the anchor plate 40 to the slide loop 50. The sheath 74 is pivoted to the pivotal orientation of FIG. 2 and the tubular sleeve portion 78 is captured by the retainer clip 106 carried by the pillar 18. The retainer clip 106 holds the tubular sleeve portion 78 flat against the pillar 18 as best shown in FIG. 1. The reversely bent flange 100 of the tubular sleeve portion 78 captures the edge of the retractable belt portion 56 to shield the retractable belt portion against airflow entering through the window and thereby prevents objectionable noise which may result from flapping of the belt. The interfit of ribs 86 on the trim panel 22 with mating ribs or notches in the rear wall 82 of the sheath 74 also function to retain the sheath 74 at the pivotal orientation of FIG. 2.

When an occupant wishes to don the seat belt system, the restraining portion 58 of the belt or the sheath 74 itself is gripped and pivoted forward to the pivotal position of FIG. 3. The latch plate 64 is gripped and pulled inwardly into engagement with the buckle 70 as permitted by extension of belt from retractor 46 so that the belt system is deployed in the phantom line indicated position of FIG. 1 in which the shoulder belt segment 66 is deployed diagonally across the occupant upper torso and the lap belt segment 68 extends across the occupant lap.

When the occupant disengages the latch plate 64 from the buckle 70, the retractor 46 will rewind the retractable belt portion 56 to return the restraint portion 58 of the belt to the vertically extending stored position of FIG. 1. However, the interfitting of the ribs 86 on the pillar with the mating ribs or notches in the rear wall 82 of the sheath 74 will cause the sheath 74 to remain at its angular orientation of FIG. 3. Thus, the shoulder belt segment 66 remains presented at the angular orientation of FIG. 3 in readiness for reentry of the occupant and subsequent donning of the belt.

Thus it is seen that the invention provides a new and useful belt storage and presenting sheath for occupant restraint system.

It will be understood that the sheath of this invention may be employed in either the active type belt system shown in the drawing or in a passive belt system where the belt system is mounted on the vehicle door. In that case the slide loop 50 and the sheath 74 would be mounted on the door pillar 30 instead of the body pillar 18 and the retractor 46 would be mounted on the door below the slide loop 50.

The embodiments of the invention in which an exclusive property or privilege is claimed are defined as follows:

1. In a motor vehicle occupant restraint belt system having a slide loop mounted on a pillar for slidably mounting the belt and defining a retractable portion of the belt extending vertically along the pillar from a retractor mounted below the slide loop and a restraint portion movable between an occupant restraining position extending diagonally across the occupant and a stored position extending along the pillar in parallel relationship with the retractable portion, a device for retaining the restraint portion in the stored position comprising:

a sheath mounted on the vehicle body in conjunction with and enclosing the slide loop, said sheath having a sleeve portion enclosing a segment of the restraint portion of the belt and movable with the restraint portion between its restraining position and stored position; and retainer means acting between the pillar and the sheath sleeve portion below the slide loop and adapted to retain the sleeve portion flat against the pillar in its position retaining the restraint portion of the belt in the stored position against the pillar.

2. In a motor vehicle occupant restraint belt system having a slide loop mounted on a pillar for slidably mounting the belt and defining a retractable portion of the belt extending vertically along the pillar from a retractor mounted below the slide loop and a restraint portion movable between an occupant restraining position extending diagonally across the occupant and a stored position extending along the pillar in parallel relationship with the retractable portion, a device for storing the restraint portion in the stored position comprising:

a sheath pivotally mounted on the vehicle body in conjunction with and enclosing the slide loop, said sheath having a sleeve portion enclosing a segment of the restraint portion of the belt and movable with the restraint portion between the restraining and stored positions, and said sheath having an integral flange extending along the length thereof at the forward edge and defining a recess adapted to capture the retractable portion of the belt upon movement of the restraint portion of the belt to the stored position against the pillar.

3. In a motor vehicle occupant restraint belt system having a slide loop mounted on a pillar for slidably mounting the belt and defining a retractable portion of the belt extending vertically along the pillar from a retractor mounted below the slide loop and a restraint belt portion movable between an occupant restraining position extending diagonally across the occupant and a stored position extending along the pillar in parallel relationship with the retractable portion, a device for alternately presenting the belt in the occupant restraining position and storing the belt in the stored position comprising:

a sheath pivotally mounted on the vehicle body in conjunction with and enclosing the anchor loop, said sheath having a sleeve portion enclosing a segment of the restraint portion of the belt and movable with the restraint portion between its restraining position extending diagonally across the occupant and its stored position extending along the pillar;

friction detent means acting between the sheath and the pillar to maintain the sheath at the particular pivotal orientation obtained relative to the pillar so that the restraining portion of the belt is presented to the occupant at that pivotal orientation upon subsequent reentry of the occupant; and a retainer clip carried on the pillar below the anchor loop and adapted to receive and retain the sleeve portion of the sheath flat against the pillar upon movement of the restraint portion to the stored position to retain the restraint belt portion of the belt in the stored position against the pillar.

4. In a motor vehicle occupant restraint belt system having a slide loop mounted on a pillar for slidably mounting the belt and defining a retractable portion of the belt extending vertically along the pillar from a retractor mounted below the slide loop and a restraint belt portion movable between an occupant restraining position extending diagonally across the occupant and a stored position extending along the pillar in parallel relationship with the retractable portion, a device for alternately presenting the belt in the occupant restraining position and storing the belt in the stored position comprising:

a sheath pivotally mounted on the vehicle body in conjunction with and enclosing the anchor loop, said sheath having a sleeve portion enclosing a segment of the restraint portion of the belt and movable with the restraint portion between its restraining position extending diagonally across the occupant and its stored position extending along the pillar;

friction detent means acting between the sheath and the pillar to maintain the sheath at the particular pivotal orientation obtained relative to the pillar so that the restraining portion of the belt is presented to the occupant at that pivotal orientation upon subsequent reentry of the occupant;

a retainer clip carried on the pillar below the anchor loop and adapted to receive and retain the sleeve portion of the sheath upon movement of the restraint portion to the stored position to retain the restraint belt portion of the belt in the stored position against the pillar; and flange means integral with the sleeve portion and adapted to capture the retractable portion of the belt upon movement of the restraint portion to the stored position against the pillar.

* * * * *